C. C. Tolman,
Wood Auger,
Nº 13,897.    Patented Dec. 4, 1855.

UNITED STATES PATENT OFFICE.

C. C. TOLMAN, OF SHELBURNE FALLS, MASSACHUSETTS, ASSIGNOR TO JAS. SARGENT AND D. P. FOSTER.

GIMLET.

Specification of Letters Patent No. 13,897, dated December 4, 1855.

*To all whom it may concern:*

Be it known that I, CHESTER C. TOLMAN, of Shelburne Falls, in the county of Franklin and State of Massachusetts, have invented a new and Improved Gimlet; and I do hereby declare that the following is a full, clear, and exact description of the same, reference being had to the annexed drawings, making a part of this specification, in which—

Figure 1:
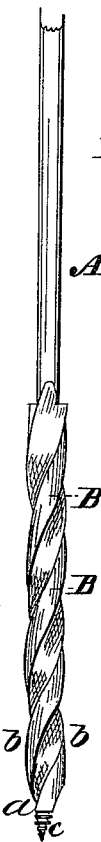
Figure 2:
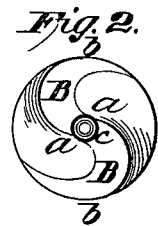

Figure 1, is an elevation of my improvement. Fig. 2, is an end view of ditto, or a face view of the cutting edge.

Similar letters of reference indicate corresponding parts in the two figures.

The nature of my invention consists in forming the gimlet with two screw threads or flanches provided with cutting edges and having the lower or outer ends of the threads or flanches curved or rounded, as will be presently shown and described.

To enable others skilled in the art to fully understand and construct my invention, I will proceed to describe it.

A, represents the shank of the gimlet, and B, B, represent two screw threads or flanches formed at the outer end of the shank, and in the usual manner. The lower or outer ends of the threads or flanches B, B, are curved or rounded in parabolic form as shown in Fig. 1, and the sides or edges of the threads or flanches have cutting edges from their outer ends to about the point (*b*) as shown in Fig. 1, or the whole length of the rounded or curved portions from (*a*) to (*b*) have cutting edges. The ends of the threads or flanches B, B, have a worm or small screw (*c*) attached. The whole of the cutting portion of both threads or flanches are shown clearly in Fig. 2, and it will be seen that by curving or rounding the ends of the threads or flanches B, B, as described that two cutting edges of gouge form are obtained. The worm or screw (*c*) may not be necessary in all cases. If the ends of the threads or flanches are brought to a point without a screw or worm, the implement will cut well, the worm or screw serves as a feeder but the taper gouge form of the cutting portions of the threads or flanches neutralizes to a great extent the ordinary utility of the worm or screw.

The implement formed or constructed as described is far preferable to the ordinary gimlet in use, it is readily sharpened and may be kept in perfect cutting order with little trouble, it also cuts with little power, and cuts rapidly and clean.

The ordinary gimlets cannot be well repaired and sharpened when worn dull by use and they are then generally thrown aside, the generality of them do not cut the wood much but merely compress the fibers as the screw is worked or twisted into the wood. There is probably no implement used in joinery that requires improvement more than the gimlet, and I have succeeded in producing a good cutting gimlet which no artisan in wood would be without after once testing it.

Having thus described my invention, what I claim as new and desire to secure by Letters Patent, is,

Constructing the lower or outer ends of the two screw threads or flanches B, B, of the gimlet in rounded or curved parabolic form and having the sides or edges of said portions of the threads or flanches brought to a sharp or cutting edge, the screw or worm (*c*) being used or not as desired.

CHESTER C. TOLMAN.

Witnesses:
 THOS. B. MONTAGUE,
 E. A. BALDWIN.